United States Patent [19]

Nokubo et al.

[11] Patent Number: 4,964,680
[45] Date of Patent: Oct. 23, 1990

[54] FLOW CONTROL VALVE FOR ANTILOCK BRAKE CONTROL DEVICE

[75] Inventors: Seiji Nokubo; Teruhisa Kohno; Koichi Hashida; Atsuo Matsumoto; Hideaki Higashimura, all of Itami, Japan

[73] Assignee: Sumitomo Electric Industries, Ltd., Osaka, Japan

[21] Appl. No.: 417,425

[22] Filed: Oct. 5, 1989

[30] Foreign Application Priority Data

Oct. 7, 1988 [JP] Japan ................... 63-254600

[51] Int. Cl.$^5$ .............................. B60T 8/42
[52] U.S. Cl. ........................ 303/115; 303/117
[58] Field of Search ............ 188/181 A; 303/61, 113, 303/114, 115, 116, 117, 119

[56] References Cited

U.S. PATENT DOCUMENTS 3,851,930 12/1974 Grosseau ........................ 303/117
4,715,666 12/1987 Farr ............................... 303/116

Primary Examiner—Duane A. Reger
Attorney, Agent, or Firm—Wenderoth, Lind & Ponack

[57] ABSTRACT

A flow control valve for antilock control includes a housing having inlet, outlet and discharge ports communicating with a master cylinder, a wheel brake and a reservoir circuit, respectively, and a spool mounted in the housing so as to be slidable between two positions. When the spool is in one of the two positions, a large-flow channel is formed between the inlet and outlet ports, whereas in the other position, a restricted-flow channel is formed therebetween. In an intermediate position, both of the channels are closed by edge portions formed on the spool. A throttled bypass channel is formed so as to branch off from the restricted-flow channel so as to be connected to the outlet port. Even if the spool should get stuck in any intermediate position between the above two positions, hydraulic oil can be fed from the inlet port to the outlet port through this throttled channel.

1 Claim, 5 Drawing Sheets

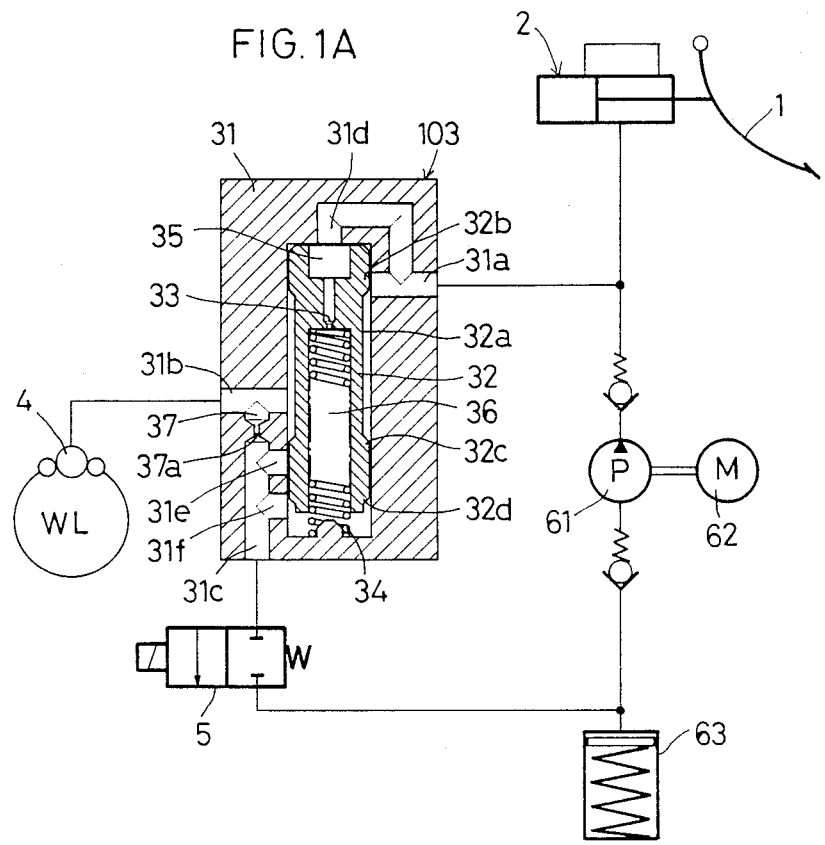
FIG. 1A
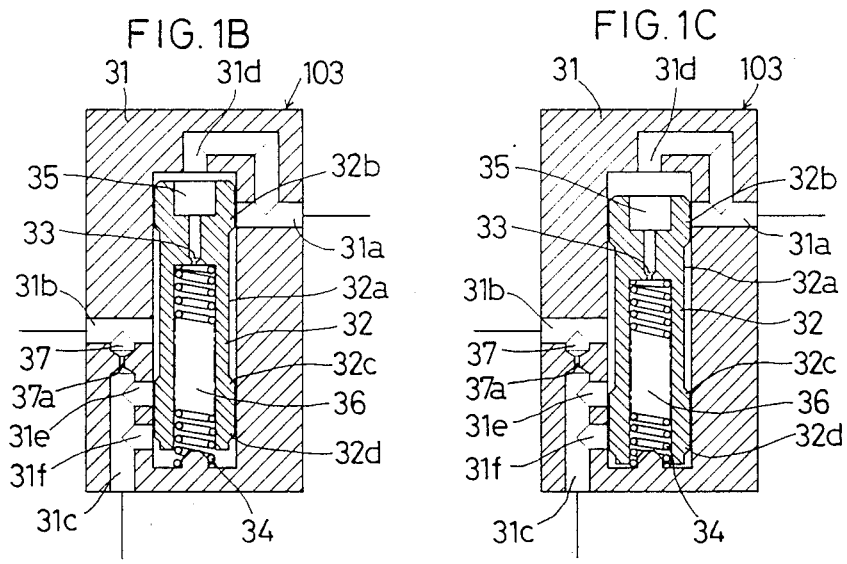
FIG. 1B
FIG. 1C

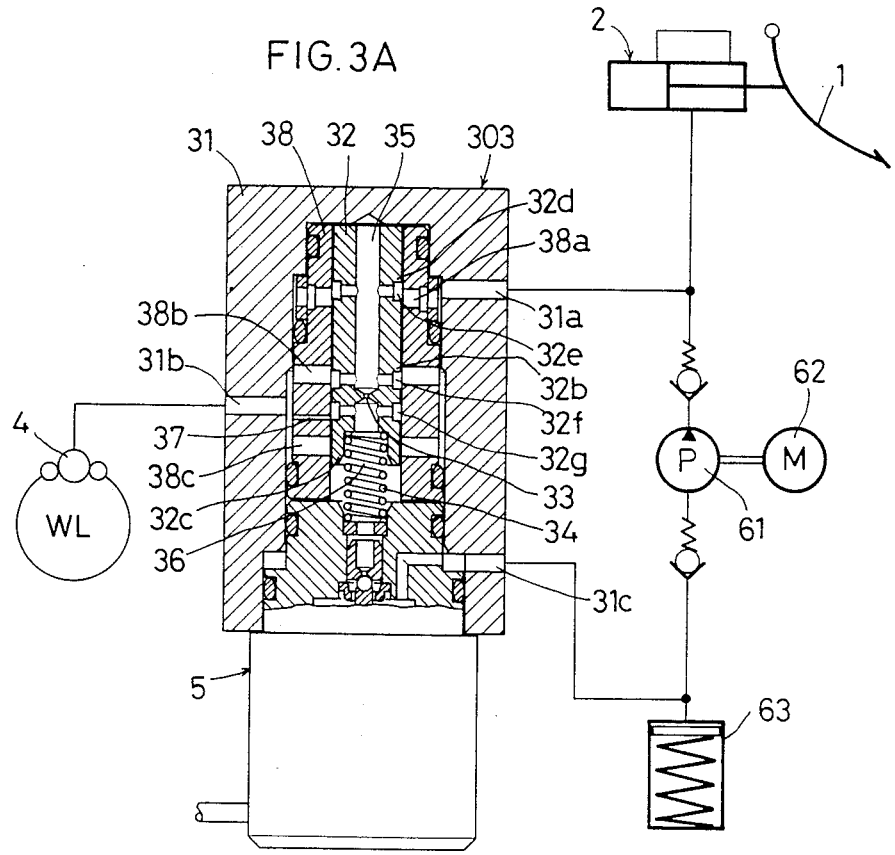
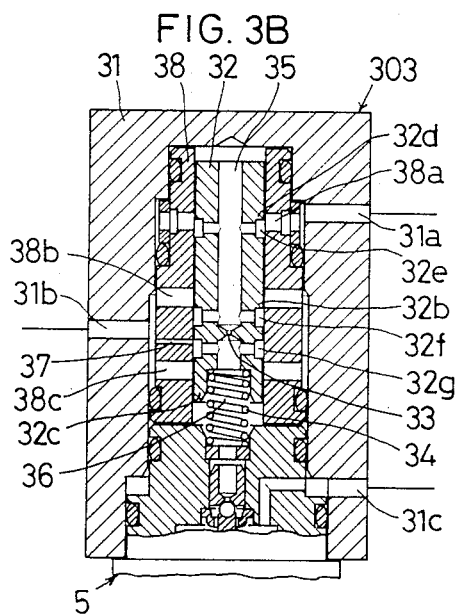
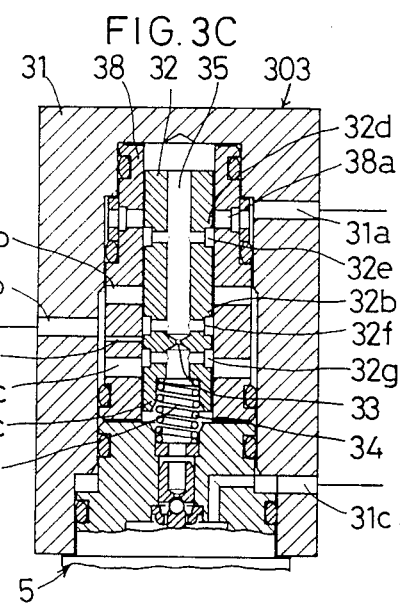
FIG. 3A
FIG. 3B
FIG. 3C

FLOW CONTROL VALVE FOR ANTILOCK BRAKE CONTROL DEVICE

The present invention relates to a flow control valve for use in an antilock brake control device for a motor vehicle.

With the spread of antilock brake control devices for motor vehicles, it is becoming an urgent requirement to develop an inexpensive antilock control device applicable to compact economy cars. To meet this requirement, it was proposed in British Patent No. 8512610 to use a single solenoid valve for each vehicle wheel and control with two control modes, i.e. pressure reduction and slow pressure increase, instead of using two solenoid valves for each vehicle wheel as disclosed in Japanese Examined Patent Publication No. 49-283071.

The device disclosed in the former publication is shown in FIGS. 6A-6C in which a flow control valve 3 is employed to increase the braking pressure in a controlled manner in place of a solenoid valve used in the latter publication. This flow control valve 3 comprises a housing 31 formed with an inlet port 31a communicating with a master cylinder 2, an outlet port 31b communicating with a wheel brake 4 and a discharge port 31c communicating with a solenoid valve 5 serving as a discharge valve, and a spool 32 slidably mounted in the housing 31 and biased by a spring 34 to open and close fluid communication among these ports. A pressure input chamber 35 and a pressure reducing chamber 36 are defined at both ends of the spool 32.

When the valve 3 is in its original position shown in FIG. 6A, where the antilock control is not in action, a large-flow channel is formed extending from the inlet port 31a to the outlet port 31b through a peripheral groove 32a formed in the outer periphery of the spool 32. In this state, a channel between the outlet 31b and the discharge port 31c is closed by an edge portion 32c.

When the solenoid valve 5 is energized and opened in the antilock control, the hydraulic oil in the pressure reducing chamber 36 will be discharged through the discharge port 31c into a reservoir 63. This will move the spool 32 to the position shown in FIG. 6B owing to a difference of pressures on both ends thereof. In this state, the abovementioned large-flow channel is closed by an edge 32b on the spool 32.

The spool 32 will further move to the position shown in FIG. 6C where part of the peripheral groove 32a at the side of an edge 32c opens to a passageway 31e. Thus a discharge channel is formed from the outlet port 31b to the discharge port 31c through the groove 32a and the passageway 31e, allowing hydraulic oil in the wheel brake 4 to be discharged into the reservoir 63 through the solenoid valve 5 to reduce the braking pressure The hydraulic oil discharged is sucked and pressurized by a pump 61 driven by a motor 62 so as to be returned to the line between the master cylinder 2 and the inlet port 31a.

When the solenoid valve 5 is deactivated in the state shown in FIG. 6C to increase the braking pressure, the spool 32 will perform metering action between its edge 32d and a passage 31f, forming a restricted-flow channel connecting the inlet port 31a with the outlet port 31b through a passage 31d, an orifice 33, the pressure reducing chamber 36, the passages 31f and 31e and the annular groove 32a. The wheel braking pressure will rise slowly. When the pressure difference between the inlet port 31a and the outlet port 31b reduces to a certain level, the spool 32 will return to its original position shown in FIG. 6A.

This arrangement is economical because each wheel can be controlled with a single solenoid valve. In the state of FIG. 6C, where the antilock control is in action and the braking pressure is on the rise, the opening of a passage formed between the metering edge 32d and the passage 31f (hereinafter referred to as variable-size orifice) is adjusted so that the flow rate of hydraulic oil through the orifice 33 is determined by the pressure difference at both ends thereof which is in turn determined by the effective sectional area of the spool 32 and the biasing force of the spring 34. Thus the pressure difference at both ends of the orifice 33 can be limited to a minimum. This will not only serve to keep constant the flow rate through the orifice irrespective of the pressure difference between the inlet port 31a and the outlet port 31b, but also make it possible to reduce the flow rate through the orifice even if it has a rather large diameter. Thus this system can be advantageously applied to a compact car having a small-sized brake which has to be controlled with a small amount of hydraulic oil.

With this type of flow control valve, while the braking pressure is being reduced for antilock control, the spool 32 is adapted to move to such a position as to close the large-flow channel connecting the inlet 31a to the outlet 31b as shown in FIG. 6B and further move to the position shown in FIG. 6C, where the outlet port 31b is brought into communication with the discharge port 31c. When increasing the braking pressure again in this state, the spool will move to open the restricted-flow channel through the orifice 33. When the spool 32 is in a position between the position shown in FIG. 6B and the position shown in FIG. 6C, both the large-flow channel as well as the restricted-flow channel are closed up by the edges 32b and 32c, respectively. If the spool 32 should get stuck in this position owing to rust or foreign matter, it will become impossible to supply brake fluid to the wheel brake 4 by the master cylinder 2.

This problem is not peculiar to a system having such a prior art control valve of the above-described type but is a common problem with any system having a spool adapted to shut off communication between an inlet and an outlet when it is in a position between its original position where a large-flow channel is formed between the inlet and the outlet and a position where a restricted-flow channel is formed to increase the braking pressure again.

An object of the present invention is to provide a flow control valve for antilock brake control which obviates the abovesaid shortcomings.

In accordance with the present invention, in such a flow control valve as described above, there is provided a throttle for communicating the outlet port with the discharge port, the throttle having such a sectional area that the pressure difference between the pressure input chamber and the pressure reducing chamber will be kept large enough to move the spool from the first position toward the second position when the shutoff valve is opened.

If the spool should get stuck in a position where brake fluid cannot be fed to the wheel brake through normal channels, the pressurized fluid from the pressure source will be applied to or discharged from the wheel brake through the throttled channel. Thus, even in such a situation, the minimum braking pressure required for normal braking control can be applied to the wheel brake. Further, since the throttled channel has such a sectional area that the pressure difference between the pressure input chamber and the pressure reducing chamber is kept large enough to move the spool downwardly when the solenoid valve is opened, so that the antilock function will remain operative even if the spool should get stuck.

Other features and objects of the present invention will become apparent from the following description taken with reference to the accompanying drawings, in which:

FIGS. 1A-1C are sectional views of the first embodiment of the present invention in different positions;

FIGS. 3A-3C are sectional views of the third embodiment in different positions;

FIRST EMBODIMENT

Figure 6A:
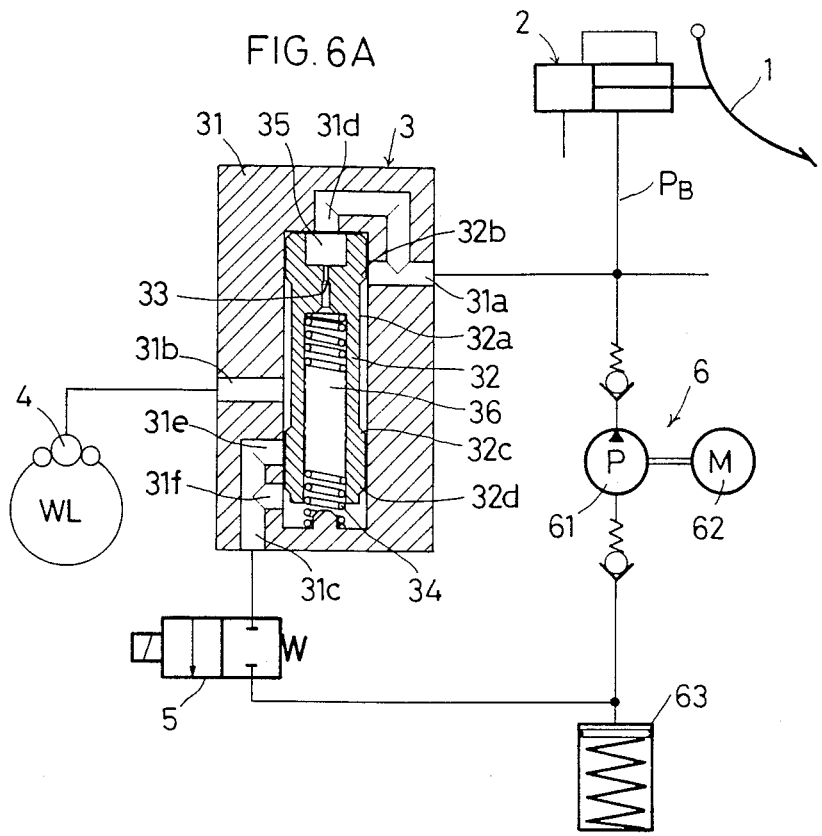
FIGS. 6A-6C are sectional views of a prior art control valve in different valve positions.
Figures 6B, 6C:
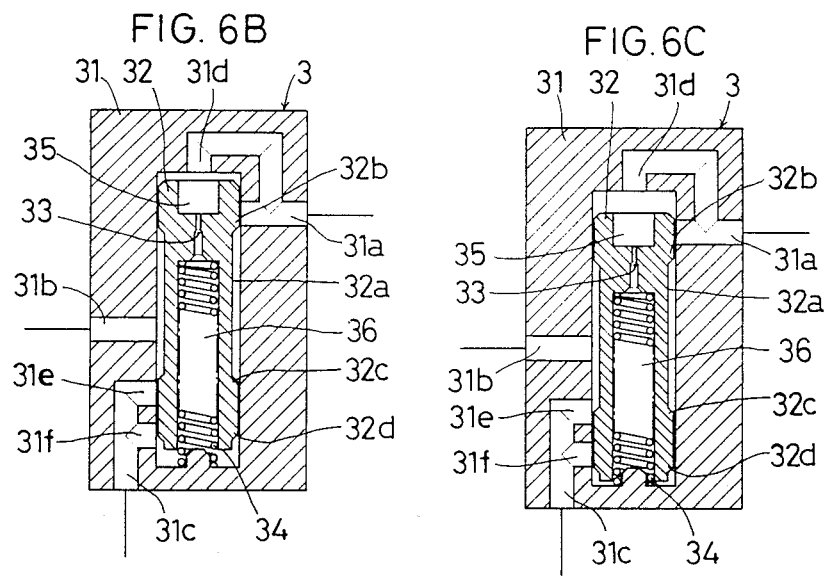

A flow control valve 103 in the first embodiment shown in FIGS. 1A-1C differs from the control valve shown in FIGS. 6A to 6C in that a channel 37 having a throttle 37a is formed in the housing 31 in parallel with the edge portion 32c. Even if the spool 32 should get stuck in the position shown in FIG. 1B, where both the large-flow channel and the restricted-flow channel are closed by the edge portions 32b and 32c, respectively, the fluid pressure generated in the master cylinder 2 can be applied to the wheel brake 4 through the inlet 31a, passage 31d, pressure input chamber 35, orifice 33, pressure reducing chamber 36, passages 31f and 31e, throttle 37a, channel 37, and outlet 31b.

The throttled portion 37a has such a sectional area that the pressure difference between the pressure input chamber 35 and the pressure reducing chamber 36 is large enough to overcome the biasing force of the spring 34 when the valve is in the position shown in FIG. 1A with the solenoid valve 5 energized and open. When the spool 32 moves to the position shown in FIG. 1B in normal conditions where the spool is not stuck, the large-flow channel will be closed by the edge portion 32b. In this state, since hydraulic oil flows only through the orifice 33, the pressure in the pressure reducing chamber 36 will drop further, thus moving the spool 32 further downwardly to the position shown in FIG. 1C. Thereafter the valve in this embodiment operates in the same manner as the prior art valve shown in FIGS. 6A and 6C.

SECOND EMBODIMENT

Figure 2A:
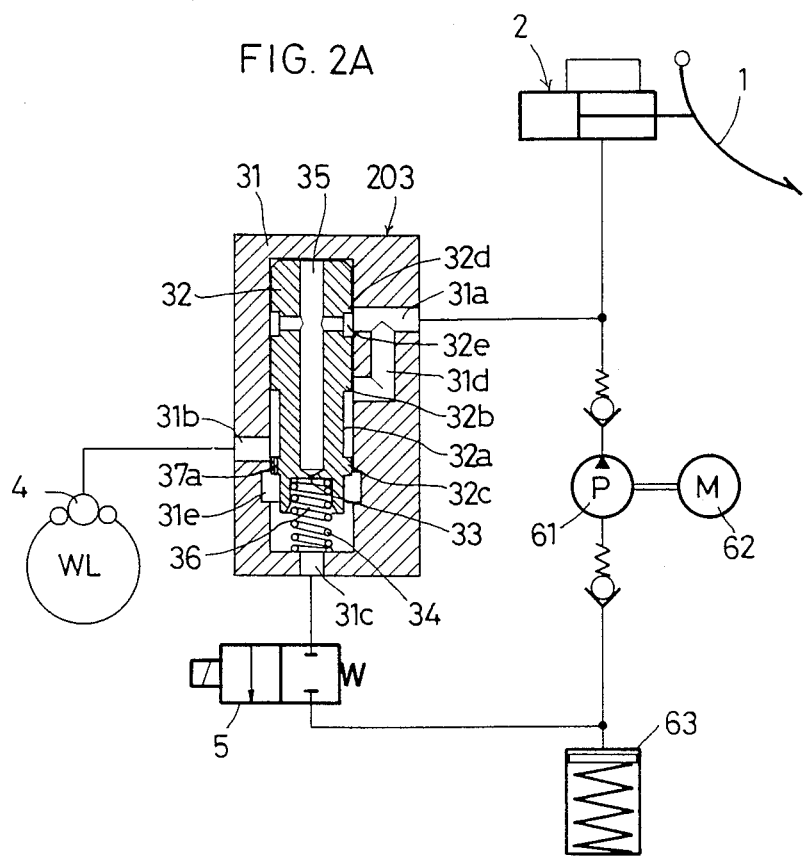
FIGS. 2A-2C are sectional views of the second embodiment in different positions.
Figure 2B:
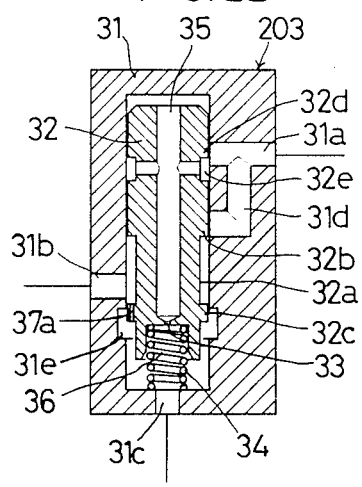
Figure 2C:
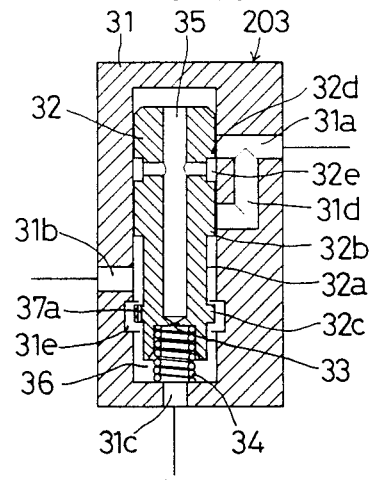

A control valve 203 in the second embodiment shown in FIGS. 2A to 2C is provided upstream of the orifice 33 with a metering edge 32d so that the metering action is performed between the metering edge 32d and the inlet 31a. The peripheral groove 32a in the spool 32 opens to a channel 31d branching from the inlet port 31a. The housing 31 is formed in the surface of its bore with a groove 31e adapted to be selectively brought into communication with the outlet 31b. A throttle 37a is formed through the edge 32c.

When the control valve 203 is in its inoperative position shown in FIG. 2A, a large-flow channel is formed which extends from the inlet 31a to the outlet 31b through the passage 31d and the peripheral groove 32a in the spool, whereas a channel connecting the outlet 31b with the pressure reducing chamber 36 is closed by the edge 32c.

When the solenoid valve 5 is opened in response to a pressure reduction command during antilock control, hydraulic oil will be supplied into the pressure reducing chamber 36 through the inlet 31a, passage 31d, peripheral groove 32a and throttle 37a. But the pressure difference between the pressure input chamber 35 and the pressure reducing chamber 36 will be kept large enough to overcome the biasing force of the spring 34 because the area of the throttle 37a is determined in the same way as with the throttle 37a in the first embodiment. Thus the spool 32 will further move to the position shown in FIG. 2B, where though the large-flow channel is closed by the edge 32b, another channel will open which extends from the inlet 31a to the outlet 31b through a port 32e in the spool, the pressure input chamber 35, orifice 33, pressure reducing chamber 36 and throttle 37a. Thus even if the spool 32 should get stuck in this position, pressure can be still applied to the wheel brake 4.

Once the large-flow channel is closed by the edge 32b, hydraulic oil is supplied into the pressure reducing chamber 36 only through the orifice 33. Thus the spool 32 will further descend to the position shown in FIG. 2C, where the edge 32c is in such a position as to open the passage 31e and thus to form a discharge channel extending from the outlet 31b to the discharge port 31c through the peripheral groove 32a, passage 31e and pressure reducing chamber 36.

When increasing the braking pressure during antilock control, metering action takes place between the metering edge 32d and the inlet 31a, thus forming a restricted-flow channel extending from the inlet 31a to the outlet 31b through the port 32e, pressure input chamber 35, orifice 33, pressure reducing chamber 36, passage 31e and peripheral groove 32a.

THIRD EMBODIMENT

FIGS. 3A to 3C show a control valve 303 in the third embodiment in which the large-flow channel is formed through the spool while the antilock control is inoperative. For easiness of manufacture, the control valve 303 in this embodiment is provided in the housing 31 with a sleeve 38 formed with ports 38a to 38c. The spool 32 is formed with ports 32e, 32f and 32g. When the valve 303 is in its inoperative position, the pressure input chamber 35 communicates with the inlet 31a through the ports 32e and 38a and with the outlet 31b through the ports 32f and 38c. When increasing the pressure during antilock control, the outlet 31b communicates with the pressure reducing chamber 36 through the ports 38c and 32g. A throttled channel 37 is formed in the sleeve 38 to connect the port 32g to the outlet 31b.

The solenoid valve 5 is integral with the housing 31 so that the discharge channel is opened and closed at a portion between the pressure reducing chamber 36 and the discharge port 31c. When the control valve is in the position shown in FIG. 3A, a large-flow channel is formed which extends from the inlet 31a to the outlet 31b through the port 38a, port 32e, pressure input chamber 35, port 32f and port 38b. In the pressure reduction phase of the antilock control, the solenoid valve 5 is energized and opened to discharge the hydraulic oil in the pressure reducing chamber 36 through the discharge port 31c. In this state, hydraulic oil is fed into the pressure reducing chamber 36 at a limited rate through the throttled channel 37, creating a pressure difference between the pressure input chamber 35 and the pressure reducing chamber 36 defined at both sides of the orifice 33. Thus the spool 32 will begin to descend. When it goes down to the position shown in FIG. 3B, the large-flow channel will be closed by the edge 32b.

Since the port 32g is kept in communication with the outlet 31b through the channel 37 up to this position, braking pressure can be applied to the wheel brake even if the spool 32 should get stuck in this position. As the spool 32 goes further down to such a position that the edge 32c is opened, a discharge channel will be formed extending from the outlet 31b to the discharge port 31c through the port 38c, port 32g and pressure reducing chamber 36. Thus the wheel brake pressure will drop. When a command to increase the braking pressure is given during antilock control, the solenoid valve 5 will be deenergized and thus closed. The flow of oil toward the discharge port 31c will stop. In the state shown in FIG. 3C, a restricted-flow channel will open which extends from the inlet 31a to the outlet 31b through the port 38a, a variable-size orifice defined between the port 38a and the metering edge 32d, port 32e, pressure input chamber 35, orifice 33, pressure reducing chamber 36, port 32g and port 38c. The opening of the variable-size orifice is automatically adjusted so that the flow rate through the restricted-flow channel will be uniform irrespective of the difference between the pressures at the inlet 31a and the outlet 31b. The flow rate is determined, as with the prior art shown in FIGS. 6A to 6C, by the pressure difference at both ends of the orifice 33 which is determined by the biasing force of the spring 34 and the effective sectional area of the spool 32.

FOURTH EMBODIMENT

Figure 4:
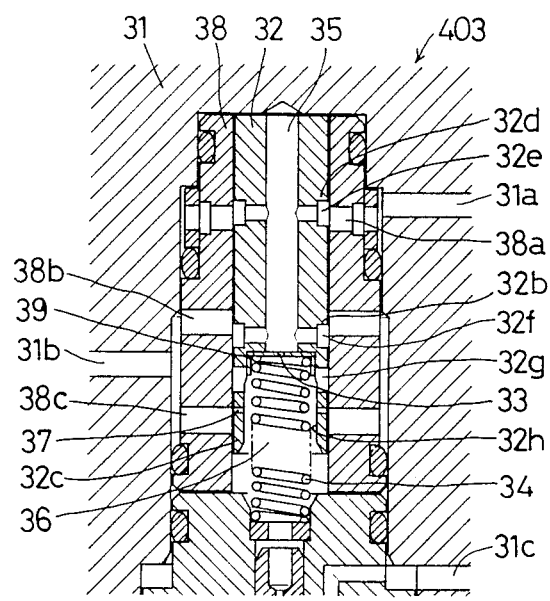
FIGS. 4 and 5 are sectional views of the fourth and fifth embodiments, respectively.

FIG. 4 shows a control valve 403 in the fourth embodiment in which the same throttled channel 37 as the one formed in the sleeve 38 in the third embodiment is formed in the edge portion 32c of the spool 32. When the spool 32 is in such a position as to close both the large-flow channel and the restricted-flow channel, the channel 37 still communicates with the port 38c and thus the outlet 31b communicates with the pressure reducing chamber 36 through the channel 37 and the port 38c. This control valve 403 is identical in performance, function and effect to the control valve 303 in the third embodiment.

FIFTH EMBODIMENT

Figure 5:
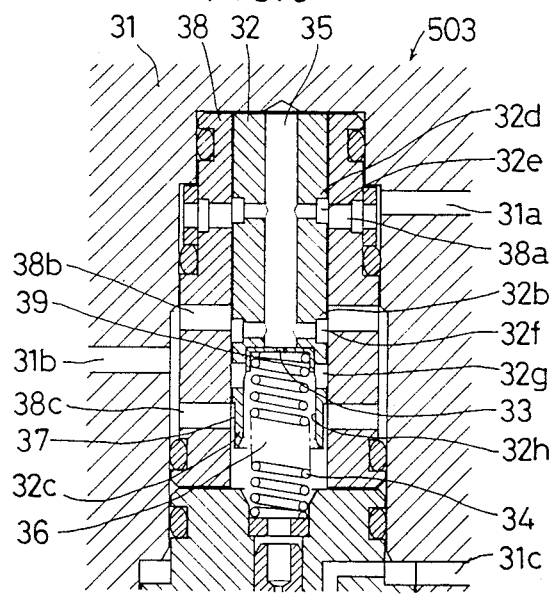

FIG. 5 shows a control valve 503 in the fifth embodiment in which the same spool as employed in the third and fourth embodiments is employed. Its edge portion 32c is formed in its outer periphery with a narrow gap which serves as the throttled channel 37, which is kept in communication with the port 38c until the spool 32 moves to such a position as to close both the large-flow channel and the restricted-flow channel. Thus in this embodiment, too, brake pressure can be applied to the wheel brake even if the spool should get stuck, on the same principle as with the third and fourth embodiments. The function and effect are the same as those of the third and fourth embodiments.

The orifice 33 shown in FIGS. 4 and 5 is formed in a shim 39 which is urged by the spring 34 against a shoulder formed on the inner periphery of the spool 32. If the difference between the pressure in the pressure input chamber 35 and that in the pressure reducing chamber 36 (the former being higher than the latter) gets abnormally large, the shim 39 is adapted to move toward the pressure reducing chamber while compressing the spring 34. With this arrangement, though it is not essential to the present invention, if the orifice 33 is clogged with foreign matter, the shim 39 will move toward the pressure reducing chamber 36 owing to an excessively large pressure difference between both chambers, forming a bypass connecting both chambers 35 and 36 together. This will further improve the reliability of the control valve according to the present invention which is adapted to supply pressure oil to the wheel brake only through the orifice 33 in case the spool gets stuck.

In the second to fifth embodiments, the variable-size orifice is located upstream of the orifice 33, whereas in the first embodiment, the channel 37 is located upwardly of the discharge port 31c. These arrangements will make it possible to expel air in the valve easily even if the solenoid valve 5 is connected directly to the bottom of the housing 31.

What is claimed is:

1. In a flow control valve for antilock control, comprising:
 a housing having an inlet port communicating with a pressure source, an outlet port communicating with a wheel brake and a discharge port communicating with a reservoir circuit having a normally closed shutoff valve,
 a spool slidably mounted in said housing and having a pressure input chamber communicating with said input port at one end thereof, a pressure reducing chamber communicating with said discharge port at the other end thereof, and a fluid passage with an orifice for communicating said pressure input chamber with said pressure reducing chamber, and
 a spring for biasing said spool toward said pressure input chamber,
 said spool having a first position at the side of said pressure input chamber where said inlet port communicates with said outlet port through a large-flow channel and a second position at the side of said pressure reducing chamber where said inlet port communicates with said outlet port through a restricted-flow channel including said orifice, said large-flow channel being adapted to be closed by a first closing portion when said spool is moved from said first position toward said pressure reducing chamber, said restricted-flow channel being adapted to be closed by a second closing portion when said spool is in said first position, said spool being adapted to be located in said first position when antilock control is not activated, to move from said first position toward said second position owing to a pressure difference between said pressure input chamber and said pressure reducing chamber when said shutoff valve is opened to activate antilock control, and to move from said second position toward said first position when the pressure difference between said inlet port and said outlet port gets lower than a predetermined value,
 said flow control valve characterized in that there is provided a throttle for communicating said outlet port with said discharge port, said throttle having such a sectional area that the pressure difference between said pressure input chamber and said pressure reducing chamber will be kept large enough to move said spool from said first position toward said second position when said shutoff valve is opened.

* * * * *